Sept. 24, 1946.     J. W. COLTMAN     2,408,198
ULTRA HIGH-FREQUENCY POWER MEASURING DEVICE
Filed Feb. 5, 1943
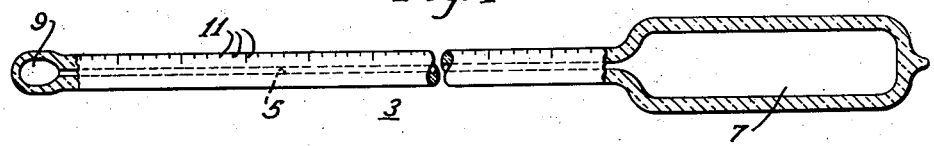
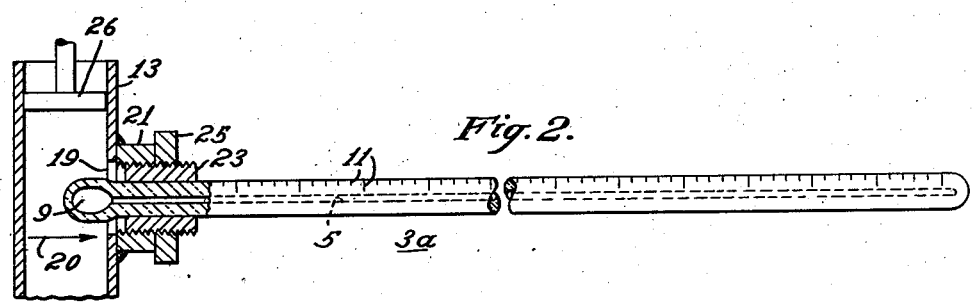
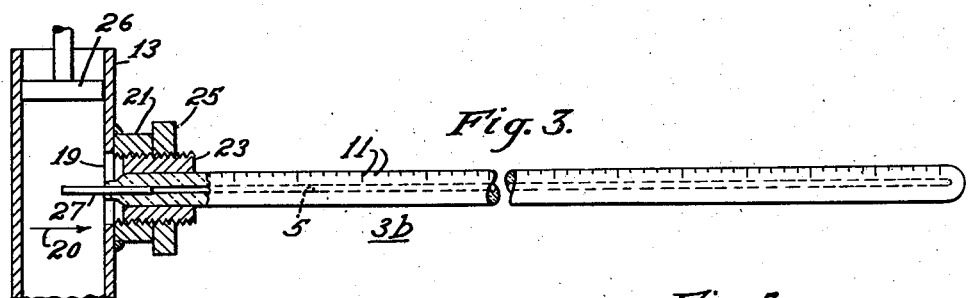
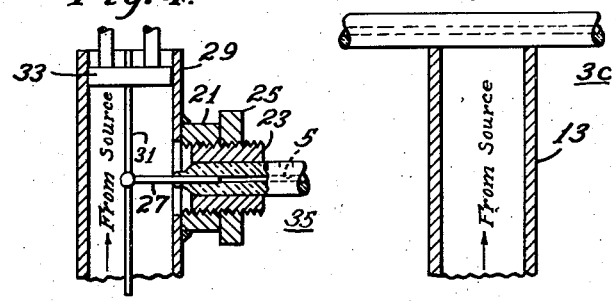
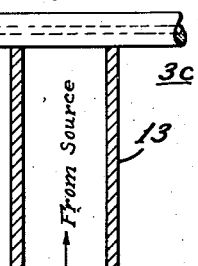
WITNESSES:
INVENTOR
John W. Coltman.
BY
ATTORNEY Patented Sept. 24, 1946

2,408,198

UNITED STATES PATENT OFFICE 2,408,198

ULTRA HIGH FREQUENCY POWER MEASURING DEVICE

John W. Coltman, Forest Hills, Pa., assignor to Westinghouse Electric Corporation, East Pittsburgh, Pa., a corporation of Pennsylvania Application February 5, 1943, Serial No. 474,884

18 Claims. (Cl. 171—95)

This invention and discovery relates to a method and device for measuring ultra high-frequency power, and has particular relation to apparatus for measuring the ultra high-frequency power delivered from a wave guide.

In accordance with prior art practices, ultra high-frequency power is measured by absorbing the energy in water and measuring the resulting increase in temperature of the water. The power output of an ultra high-frequency generator is often measured in this way. The wave guide is disconnected from the load adjacent to the generator and a cap is mounted over the open end of the wave guide. The cap includes a quartz plate extending directly across the wave guide opening and the remainder of the cap cooperates with the quartz plate to form a small chamber immediately above the plate. A water reservoir, pump and conduits are then arranged to pass a constant stream of water through the chamber. The position and form of the plate and chamber are such as to permit all of the energy incident to the plate to be absorbed in the water. Knowing the rate of flow of the water and the temperature of the water before and after it passes through the chamber, the average power may be calculated.

The water temperature arrangement for determining the power gives good results but also has certain objectionable features. The apparatus is quite bulky and requires not only a water supply but certain supplementary equipment, including pumps, conduits, valves, and sensitive galvanometers. Consequently, it is impractical for use in the field and inconvenient to handle in the laboratory. In addition, the apparatus cannot show an erratic supply from the source because there is a time lag in the response of the water temperature as indicated on the galvanometers, to changes in the source. If tuning operations are carried out to vary the output of the source, an appreciable time must elapse, because of the slow response in the indicated water temperature, before the effect of the tuning operations on the output can be determined. Moreover, the arrangement enables comparatively easy calculation of the average power but the duty cycle must be known to calculate the peak power. Other difficulties encountered in the use of the water temperature arrangement involve the control of the rate of water flow and the positioning of the cap on the end of the wave guide.

A relatively quick estimate of the power being delivered from a wave guide may be made by placing an ordinary neon bulb over the output end of the guide, causing the bulb to glow. The brightness of the glow produced in the bulb is an indication of the strength of the field producing the ionization of the neon gas. However, the use of a neon bulb enables only a very rough estimate of the power to be made for the visual impression of brightness is extremely difficult to retain. Moreover, the glow in a neon bulb is violently affected by slight changes in the neighboring electric field, such as might be introduced by reflection from nearby objects.

It is, therefore, an object of my invention to provide a simple and inexpensive device for measuring ultra high-frequency power.

It is another object of my invention to provide novel apparatus for measuring ultra high-frequency power which enables a direct, instantaneous and accurate reading of the power to be made.

A further object of my invention is to provide a new and improved method of measuring ultra high-frequency power.

It is still another object of my invention to provide a novel method and apparatus for measuring the ultra high-frequency power delivered from a wave guide.

Another object of my invention is to provide a novel device for measuring ultra high-frequency peak power.

It is a further object of my invention to provide a simplified device for measuring ultra high-frequency power which is not affected by slight changes in the neighboring electric field.

More specifically, it is an object of my invention to provide a compact, portable device for measuring ultra high-frequency power which does not require any supplementary apparatus or supply sources.

My invention arises from the discovery that upon introduction of an electric field into an insulated column of gas at a selected point thereon with the column of a capillary cross-sectional area and the gas of the type which produces a visible glow in the presence of an electric field above a predetermined intensity, a portion of the column extending from the selected point produces a glow. There is a sharp line of demarcation between the glowing and the non-glowing gas and the length of the glowing column is a measure of the intensity of the electric field which is introduced into the column and of the power absorbed thereby.

My discovery may be advantageously employed in the provision of a measuring device comprising an elongated envelope of translucent insulating material having a capillary bore therein filled with neon or other gas which produces a glow in the presence of an electric field of a predetermined intensity. The device is adapted to have the electric field to be measured introduced at a selected point in the capillary bore. If the intensity of the introduced field is sufficiently great, the gas is ionized at the point of introduction and acts as a partial conductor along which the field travels.

As the field travels along the column of ionized gas contained within the capillary bore, its energy is dissipated in ionizing the gas, losses in the material of which the envelope is formed, and in radiation. When the field intensity decreases below the critical value necessary to ionize the gas, the glow ceases at that point. Thus a column of glowing gas extends along the capillary bore from the selected point for a distance depending upon the original intensity of the field introduced into the capillary bore and the distance is a measure of the power absorbed by the device. It has been discovered that the glow diminishes slightly in brightness along the capillary bore but that it comes to a termination very suddenly. Moreover, it has been discovered that slight changes in neighboring electric fields as might be caused by wave reflections, do not affect the length of the glowing column. A calibrated scale may be placed along the capillary bore to give a direct reading of the intensity of the electric field introduced in the bore or the power absorbed by the device.

The electric field may be introduced into the capillary bore in various ways. A satisfactory way is to provide a small exciting chamber at one end of the bore of larger diameter but considerably shorter in length than the bore. This chamber is also filled with gas and is adapted to be positioned to be exposed to the electric field to be measured. The field then ionizes the gas in the chamber which acts as a partial conductor to introduce the electric field into the bore. Other arrangements for introducing the field into the bore may also be employed advantageously such as the use of a conducting electrode or electrodes exposed to the electric field. It has also been discovered that an electric field of high intensity may be introduced into the capillary bore by merely placing a portion thereof directly in the path of the energy. An exciting chamber is preferable, however, because the increased relation between the volume of the gas and the area of the surface within which it is contained greatly facilitates the original ionization of the gas.

Although the intensity of any ultra high-frequency electric field may be measured by this new method, apparatus is provided in accordance with my invention for measuring power in systems in which the power is transmitted through hollow wave guides. As the length of the column of glowing gas in the envelope is a measure of the power absorbed thereby, it is apparent that if a known percentage of the power in a wave guide is diverted into the capillary bore of the envelope, a power reading may be taken.

A simple way of diverting a known percentage of power from a wave guide into the capillary bore of an envelope is to divert all of the power. The wave guide may be disconnected from the load and a small additional section of wave guide connected thereto. A fitting is provided to mount the envelope on the wave guide section with the exciting chamber or electrode extending into the wave guide so that it is exposed to the electric field in the guide. A shorting stub is then inserted in the output end of the guide section and adjusted to eliminate wave reflections so that all the power is diverted into the capillary bore of the envelope.

It then becomes apparent that the same calibrated measuring apparatus may be employed in different systems of the same frequency and wave length. It is compact, portable and inexpensive. In addition it may be conveniently employed in the field and enables an instantaneous reading of the peak power.

The features that I consider characteristic of my invention are set forth with particularity in the appended claims. The invention itself, however, both as to its organization and its method of operation together with additional objects and advantages thereof will best be understood from the following description of specific embodiments when read in connection with the accompanying drawing, in which:

Figure 1 is a view of the preferred embodiment of the measuring device,

Fig. 2 illustrates an arrangement for measuring the power in a system using a wave guide, and Figs. 3, 4 and 5 illustrate various arrangements for introducing the electric field into the capillary column of gas.

As shown in Fig. 1, the preferred embodiment of the measuring device consists of an elongated envelope 3 of glass or other translucent insulating material. The envelope 3 has therein a capillary bore 5 extending from a reservoir 7 at one end to a small exciting chamber 9 at the other end. The chamber 9 is of slightly larger cross sectional area than the capillary bore 5 but is considerably shorter in length. The capillary bore 5, reservoir 7 and chamber 9 are filled with neon or other gas of the type which produces a glow in the presence of an electric field of a predetermined intensity.

The envelope 3 is adapted to be positioned with the chamber 9 exposed to the electric field to be measured. The field causes the gas in the chamber to be ionized forming a partial conductor for the electric field to introduce it into the end of the capillary bore 5. The gas at the end of the capillary bore is ionized by the electric field which is introduced therein and the ionized gas conducts the field along the capillary bore. As the field is conducted along the bore, it dissipates its energy and the intensity of the field decreases gradually as it is conducted along the capillary bore until it falls below the critical value necessary to maintain ionization of the gas. The length of the capillary bore is such that the field intensity drops below the critical value intermediate the ends of the bore. Thus the field causes only a portion of the gas in the capillary bore to produce a glow, there being a sharp line of demarcation between the ionized or glowing gas and the non-glowing gas. A calibrated scale 11 extends along the capillary bore 5 to facilitate measuring the length of the glowing column and to give a direct reading of the power absorbed by the device.

The reservoir 7 is used to replace gas losses and insure an adequate supply of gas in the capillary bore and thereby extend the life of the device. However, the reservoir is not essential to the operation of the device.

In Fig. 2, a wave guide 13 supplied from a source of ultra high-frequency power is shown in cross-section with an opening 19 in a wall of the guide which is normal to the electric field created in the guide when power is supplied thereto, the direction of the field being indicated by an arrow 20. The opening 19 is surrounded by an internally threaded boss 21 mounted on the outside of the guide. The glass tube or envelope 3a with the capillary bore 5 is similar to envelope 3 in Fig. 1 but does not have a reservoir and has a member 23 cemented about the end thereof adjacent to the chamber 9. The member 23 is threaded to screw into the boss 21 and support envelope 3a with the chamber 9 within the wave guide, as shown, exposed to the electric field in the guide. A nut 25 is then employed to hold the member 23 in the desired position.

A shorting stub 26 is provided in the output end of the wave guide. This stub may be of any suitable shape, there being various designs in use at present, and serves to create a short circuit across the end of the guide. The position of the stub is adjustable so that by proper adjustment of the stub 26 and the position of the exciting chamber 9, wave reflections may be eliminated so that substantially all of the power is diverted into the capillary bore. I have discovered that the wave reflections may be eliminated more readily if the exciting chamber of the envelope is inserted through a wall of the guide which is normal to the electric field in the guide.

In Fig. 3 is illustrated a device having the chamber 9 of Fig. 2 replaced by a conducting electrode 27. The envelope 3b is mounted on a wave guide in the manner described in Fig. 2 with the electrode 27 extending from the bore 5 into the guide. The electrode 27 then serves to introduce the electric field into the end of the capillary bore 5.

In Fig. 4 is illustrated an arrangement for introducing the electric field into the capillary bore from a coaxial transmission line 29. The envelope 3b is mounted on the outer conductor of the coaxial line similarly to the mounting of the envelope on the wave guide in Fig. 3, but the conducting electrode 27 in the end of the capillary bore 5 is connected to the center conductor 31 of the coaxial line. A shorting stub 33 is employed to direct substantially all of the power into the capillary bore.

In measuring power above a predetermined magnitude the use of an igniting chamber or electrode may be avoided. In such a situation, a capillary tube 3c sealed at both ends and filled with gas will be effective if a portion of the tube itself is placed across the wave guide as shown in Fig. 5. Of course, if the tube 3c extends on both sides of the guide, the glowing column also extends on both sides. If desired, the tube 3c may extend through the guide intermediate the ends and a shorting stub employed.

It is to be noted that a capillary bore must be employed to support the gas column. If a large bore is used, the glow tends to follow the surface of the bore producing glowing fingers and the line between glowing and non-glowing gas is extremely irregular and quite shadowy.

In ultra high-frequency systems using a wave length of 3 centimeters, I have found a bore of approximately 3 millimeters or less in diameter is satisfactory with a diameter of .5 millimeter preferred. Neon gas is also preferred at a pressure of approximately 7 millimeters. The device may be calibrated in kilowatts with a peak power of 5 kilowatts giving a glowing column over ten centimeters in length with a .5 millimeter bore.

Although I have shown and described a preferred embodiment of my invention, I am fully aware that many modifications thereof are possible. My invention, therefore, is not to be restricted except insofar as is necessitated by the prior art and the spirit of the appended claims.

I claim as my invention:

1. A device for measuring the intensity of an ultra high-frequency electric field comprising an elongated envelope of translucent, insulating material having a capillary bore therein filled with gas of the type which produces a glow in the presence of an electric field of a predetermined intensity, said envelope being adapted to have the electric field to be measured introduced into said bore at a selected place whereby said field travels along said bore from said place, said bore being of such length that said field decreases below said predetermined intensity intermediate the ends of the bore.

2. A device for measuring the intensity of an ultra high-frequency electric field comprising an elongated envelope of translucent, insulating material having a capillary bore therein filled with gas of the type which produces a glow in the presence of an electric field of a predetermined intensity, said envelope being adapted to have the electric field to be measured introduced into said bore at a selected place whereby said field travels along said bore from said place, said bore being of such length that said field decreases below said predetermined intensity intermediate the ends of the bore, and a calibrated scale extending along said bore.

3. A device for measuring the intensity of an ultra high-frequency electric field comprising an elongated envelope of translucent, insulating material having a capillary bore therein filled with gas of the type which produces a glow in the presence of an electric field above a predetermined intensity, and exciting means associated with said bore which is effective when exposed to an electric field to introduce that field into said bore at a selected place whereby said field travels along said bore from said place, said bore being of such length that said field decreases below said predetermined intensity intermediate the ends of the bore.

4. A device for measuring the intensity of an ultra high-frequency electric field comprising an elongated envelope of translucent, insulating material having a capillary bore therein filled with gas of the type which produces a glow in the presence of an electric field above a predetermined intensity, means associated with said bore for introducing the electric field to be measured into said bore at a selected point whereby said field travels along said bore from said point, said bore being of such length that said field decreases below said predetermined intensity intermediate the ends of the bore, and a calibrated scale extending along said bore.

5. A device for measuring the intensity of an ultra high-frequency electric field comprising an elongated capillary tube of translucent, insulating material, sealed at both ends and filled with gas of the type which produces a glow in the presence of an electric field of a predetermined intensity.

6. A device for measuring the intensity of an ultra high-frequency electric field comprising an elongated capillary tube of translucent, insulating material, sealed at both ends and filled with gas of the type which produces a glow in the presence of an electric field of a predetermined intensity, and a calibrated scale extending along said tube.

7. A device for measuring the intensity of an ultra high-frequency electric field comprising an elongated capillary tube of translucent, insulating material, said tube having a bore of a diameter of the order of .5 to 3 millimeters, sealed at both ends and filled with gas of the type which produces a glow in the presence of an electric field of a predetermined intensity.

8. A device for measuring the intensity of an ultra high-frequency electric field comprising an elongated envelope of translucent, insulating material having therein an exciting chamber at one end and a reservoir at the other end and a capillary bore interconnecting said chamber and reservoir, said chamber, reservoir and bore being filled with gas of the type which produces a glow in the presence of an electric field of a predetermined intensity.

9. A device for measuring the intensity of an ultra high-frequency electric field comprising an elongated envelope of translucent, insulating material having therein an exciting chamber at one end and a reservoir at the other end and a capillary bore of a diameter of the order of .5 to 3.0 millimeters interconnecting said chamber and reservoir, said chamber, reservoir and bore being filled with gas of the type which produces a glow in the presence of an electric field of a predetermined intensity.

10. A device for measuring the intensity of an ultra high-frequency electric field comprising an elongated envelope of translucent, insulating material having therein an exciting chamber at one end and a reservoir at the other end and a capillary bore interconnecting said chamber and reservoir, said chamber, reservoir and bore being filled with gas of the type which produces a glow in the presence of an electric field of a predetermined intensity, and a calibrated scale extending along said bore.

11. A device for measuring the intensity of an ultra high-frequency electric field comprising an elongated envelope of translucent, insulating material having a capillary bore therein filled with gas of the type which produces a glow in the presence of an electric field of a predetermined intensity, and conducting electrode means extending into said bore at a selected point.

12. A device for measuring the intensity of an ultra high-frequency electric field comprising an elongated envelope of translucent, insulating material having a capillary bore therein of a diameter of the order of .5 to 3 millimeters filled with gas of the type which produces a glow in the presence of an electric field of a predetermined intensity, and conducting electrode means extending into said bore at a selected point.

13. A device for measuring the intensity of an ultra high-frequency electric field comprising an elongated envelope of translucent, insulating material having therein a bore of a diameter of the order of .5 to 3.0 millimeters filled with gas of the type which produces a glow in the presence of an electric field above a predetermined intensity, exciting means associated with said bore for introducing the electric field to be measured into said bore at a selected point whereby said field travels along said bore from said point, and a scale extending along said bore.

14. A device for measuring the intensity of an ultra high-frequency electric field comprising an elongated envelope of translucent, insulating material having therein a bore of a diameter of the order of .5 to 3.0 millimeters filled with gas of the type which produces a glow in the presence of an electric field above a predetermined intensity, and exciting means associated with said bore for introducing the electric field to be measured into said bore at a selected point.

15. A device for measuring the intensity of an ultra high-frequency electric field comprising an elongated envelope of translucent, insulating material having therein an exciting chamber and a capillary bore opening into said chamber with said bore and chamber being filled with gas of the type which produces a glow in the presence of an electric field of a predetermined intensity.

16. A device for measuring the intensity of an ultra high-frequency electric field comprising an elongated envelope of translucent, insulating material having therein an exciting chamber and a capillary bore opening into said chamber, said bore and chamber being filled with gas of the type which produces a glow in the presence of an electric field of a predetermined intensity, and a scale extending along said bore.

17. A device for measuring the intensity of an ultra high-frequency electric field comprising an elongated envelope of translucent, insulating material having therein an exciting chamber and a bore of a diameter of the order of .5 to 3.0 millimeters opening into said chamber, said bore and chamber being filled with gas of the type which produces a glow in the presence of an electric field of a predetermined intensity.

18. A device for measuring the intensity of an ultra high-frequency electric field comprising an elongated envelope of translucent, insulating material having a capillary bore therein filled with gas of the type which produces a glow in the presence of an electric field above a predetermined intensity, conducting electrode means extending into said bore for introducing the electric field to be measured into said bore at a selected point whereby said field travels along said bore from said point, and a scale extending along said bore.

JOHN W. COLTMAN.